UNITED STATES PATENT OFFICE.

WATERMAN T. BURRELL, OF WEYMOUTH, MASSACHUSETTS.

IMPROVEMENT IN PAINT COMPOUNDS.

Specification forming part of Letters Patent No. 125,436, dated April 9, 1872.

*To all persons to whom these presents may come:*

Be it known that I, WATERMAN T. BURRELL, of Weymouth, of the county of Norfolk and State of Massachusetts, have invented a new and useful Composition to be used as a Paint; and do hereby declare the same, the ingredients thereof, and mode of compounding them, to be fully described, as follows:

The particular object of my invention is to utilize what are termed "paint-skins" by painters, or oil-paint which may have dried on a surface, and may no longer be required for the protection of such surface.

In carrying out my invention I take one hundred pounds of the paint-skins or waste oil-paint, as mentioned, and put with the same in a kettle or boiler ten pounds of potash and two gallons of soft water. After allowing them to stand for about twenty-four hours I boil the whole until dissolution of the paint-skins or paint is effected, after which I add to the solution five pounds of silicate of soda. Next, I take ten pounds of common whiting, and mix it in a tub with one gallon of linseed-oil, and after having strained the solution hereinbefore named I combine or thoroughly mix it with the mixture of oil and whiting, and after the whole may have become sufficiently cool I grind it in a paint-mill. The composition will then be fit for use, and may be reduced by mixing it with either oil or water to the extent that may be desirable to enable it to be spread by a brush upon a surface, and used as a paint therefor.

In order to change or modify the color of the composition any pigment or coloring-matter suitable to the purpose may be combined or mixed with the composition to such extent as may suffice.

I do not confine my invention to the precise proportions as stated of the ingredients herebefore named, as such may be somewhat varied without materially affecting the composition.

What I claim as my invention is—

1. The composition described, made in manner substantially as hereinbefore specified.

2. I also claim the process, as explained, of making the aforesaid composition.

WATERMAN T. BURRELL.

Witnesses:
   R. H. EDDY,
   J. R. SNOW.